United States Patent
Haberman et al.

(10) Patent No.: US 7,827,310 B1
(45) Date of Patent: Nov. 2, 2010

(54) HOST CONNECTIVITY VERIFICATION

(75) Inventors: Ron E. Haberman, San Jose, CA (US); Miroslav Vrana, Zumikon (CH); Joseph M. Regan, Pleasanton, CA (US); Wim Henderickx, Westerlo (BE)

(73) Assignee: Alcatel Lucent, Paris (FR)

( * ) Notice: Subject to any disclaimer, the term of this patent is extended or adjusted under 35 U.S.C. 154(b) by 877 days.

(21) Appl. No.: 11/413,965

(22) Filed: Apr. 27, 2008

(51) Int. Cl.
*G06F 15/16* (2006.01)

(52) U.S. Cl. ........................................................ 709/245

(58) Field of Classification Search ................... 709/245
See application file for complete search history.

(56) References Cited

U.S. PATENT DOCUMENTS

| | | | | |
|---|---|---|---|---|
| 2002/0138854 | A1* | 9/2002 | Desai et al. | 725/147 |
| 2006/0018263 | A1 | 1/2006 | McGee et al. | |
| 2006/0268766 | A1* | 11/2006 | Rangarajan et al. | 370/328 |

* cited by examiner

*Primary Examiner*—Wing F Chan
*Assistant Examiner*—Andrew Woo
(74) *Attorney, Agent, or Firm*—Van Pelt, Yi & James LLP

(57) ABSTRACT

Verifying subscriber host connectivity is disclosed. In some embodiments, a unicast address resolution protocol (ARP) request is sent to a subscriber host, and based at least in part on whether a response to the request is received from the subscriber host, it is determined whether the subscriber host remains connected to a network.

22 Claims, 3 Drawing Sheets

| IP | MAC |
|---|---|
|  |  |
|  |  |
|  |  |
|  |  |
|  |  |
|  |  |
| ⋮ | ⋮ |
|  |  |

FIG. 3

HOST CONNECTIVITY VERIFICATION

BACKGROUND OF THE INVENTION

Typically, in an IP-based network that employs a sessionless networking protocol, such as the dynamic host configuration protocol (DHCP), to enable subscriber hosts to connect to and access services via the network, no indication is available at the network service provider side when a subscriber host terminates a connection. As a result, absent an independent way to verify subscriber host connectivity, overhead associated with a subscriber host at the provider side, e.g., overhead associated with maintaining structures and processes configured to enforce policy and QoS requirements associated with the subscriber host, would have to be provided for the duration of the IP or other network address lease granted to the subscriber host, even though the subscriber host may in fact no longer be connected to the network.

Thus, there is a need for a manner to detect host connectivity state in a network that uses a networking protocol in which host connectivity state is not maintained.

BRIEF DESCRIPTION OF THE DRAWINGS

Various embodiments of the invention are disclosed in the following detailed description and the accompanying drawings.

FIG. 3 illustrates an embodiment of a data structure of an ARP cache.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Verifying subscriber host connectivity is disclosed. In some embodiments, a unicast address resolution protocol (ARP) request is sent to a subscriber host, and based at least in part on whether a response to the request is received from the subscriber host, it is determined whether the subscriber host remains connected to a network.

Figure 1:
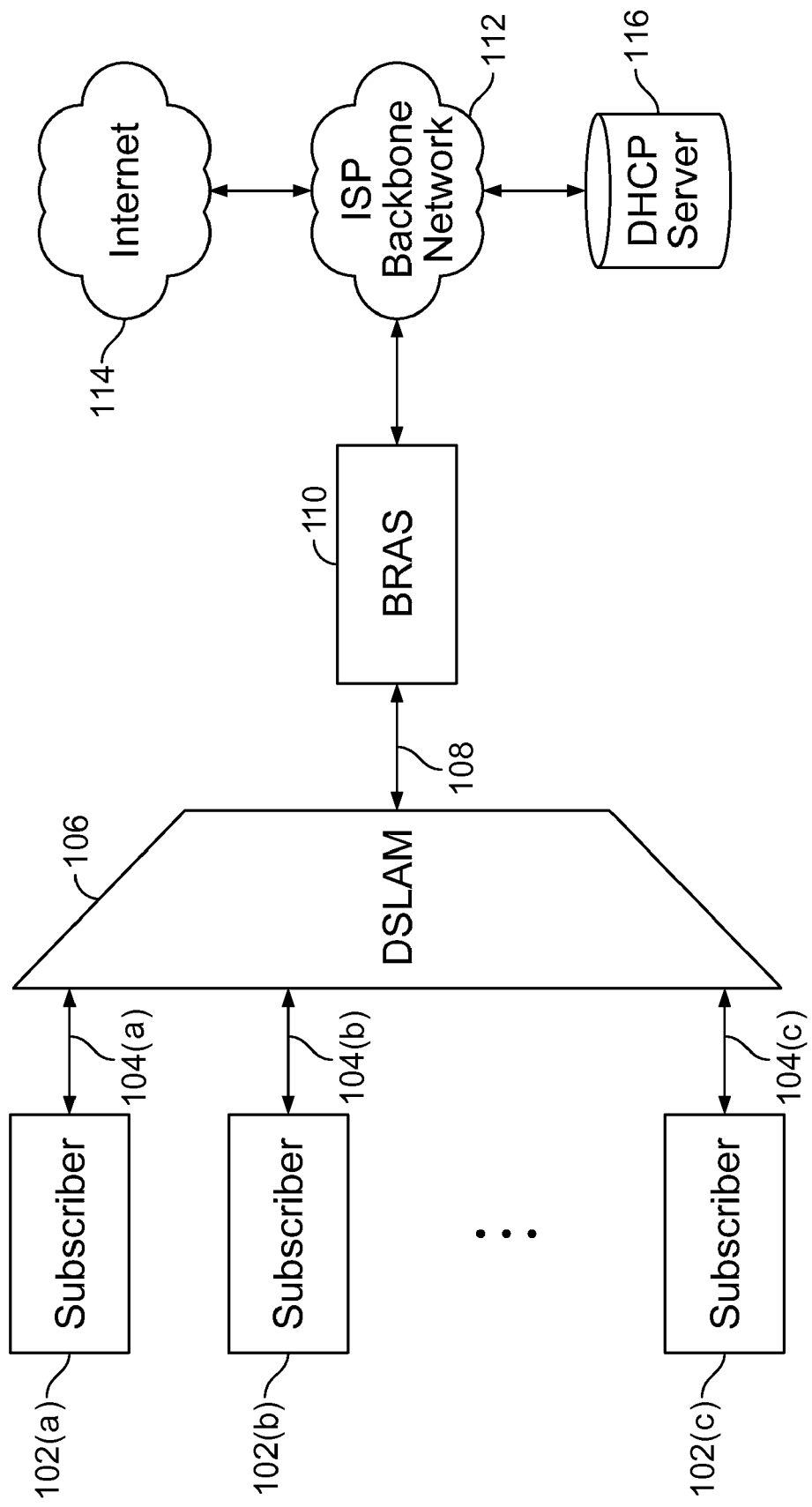
FIG. 1 illustrates an embodiment of a manner in which broadband connectivity is provided to a subscriber host from an interne service provider.

FIG. 1 illustrates an embodiment of a manner in which broadband connectivity is provided to a subscriber host from an internet service provider. As depicted, each of a plurality of subscriber hosts 102 is connected via a dedicated DSL (Digital Subscriber Line) connection 104 to an associated DSLAM (Digital Subscriber Line Access Multiplexer) 106. Although a DSLAM is sometimes described herein, any other type of access node may be employed. Signals from the subscriber hosts 102 on DSL connections 104 are multiplexed by DSLAM 106 onto a high-speed line 108. Line 108 facilitates communication between DSLAM 106 and an associated BRAS (Broadband Remote Access Server) 110. Although a BRAS is sometimes described herein, any other broadband network gateway (BNG) may be employed. BRAS 110 routes traffic to and from an ISP's backbone network 112 which provides connectivity to the Internet 114 and is the injection point for subscriber host policy management and IP QoS (Quality of Service) enforcement. In some embodiments, BRAS 110 comprises a multi-service edge router and/or switch, such as an Alcatel™ 7750 service router and/or an Alcatel™ 7450 edge service switch. Traffic received from the Internet 114 and/or ISP backbone network 112 for one or more subscriber hosts 102 is routed by BRAS 110 over line 108 and demultiplexed at DSLAM 106 for transmission to the intended subscriber hosts 102.

Although the term "subscriber host" may be sometimes used herein to describe the subscriber end 102 of DSL connections 104, the techniques described herein are not limited to a single subscriber host at each subscriber end 102. In various embodiments, one or more of the subscriber hosts 102 may correspond to bridged or routed residential gateways configured to allow multiple associated hosts to access network services via DSLAM 106 and BRAS 110. Although for simplicity a single ISP is illustrated in FIG. 1, depending on the various ISPs with which the subscriber hosts 102 are subscribed, DSLAM 106 and/or BRAS 110 may facilitate broadband connectivity between a plurality of different ISPs and their associated subscriber hosts 102.

In various embodiments, it may be desirable to employ a non-session based networking protocol such as DHCP (Dynamic Host Configuration Protocol) in an IP (Internet Protocol) based network as opposed to a session-based networking protocol such as PPPoE (Point-to-Point Protocol over Ethernet). For example, advantages exist in the use of session-less protocols for the delivery of certain types of content, such as video on demand over IP, broadcast video over IP, IP-TV, etc. In some embodiments, it may be desirable to employ a session-less, client-driven pull protocol such as DHCP instead of a session-based, server-driven push protocol to reduce the overhead of administering subscriber host connectivity at one or more associated access servers, such as BRAS 110 of FIG. 1, that is associated with push protocols. Although DHCP may be sometimes described, the techniques disclosed herein are not limited to DCHP but may be employed with respect to any other networking protocol that is not session-based.

Returning to FIG. 1, a DHCP server 116 facilitates the establishment of a DHCP lease for a subscriber host 102 at BRAS 110. When a subscriber host first goes online, e.g., after a period of off-line activity, upon being booted, etc., a DHCP client at the subscriber host initiates communication with DHCP server 116 which, in response, facilitates the establishment of a DHCP lease that grants the DHCP client permission to use a particular static or dynamic IP address for a prescribed period of time among one or more other applicable specifications, such as a DNS server, WINS server, domain name, subnet mask, etc. During network communications to and from the subscriber host, the subscriber host is identified by the DHCP protocol by an associated client identifier. By default, DHCP implementations typically employ the subscriber host's physical or MAC (Media Access Control) address for this purpose, although the DHCP protocol allows other options as well.

Because DHCP is a client-driven protocol, once a lease is established for a client, unless an independent way to verify subscriber host connectivity is provided the associated BRAS must assume the subscriber host remains connected until the DHCP lease expires, even if the associated network connection has been terminated at the client end, e.g., if the associated subscriber host goes offline. Thus, unlike session-based networking protocols in which an associated lease is automatically terminated when a subscriber host disconnects, with session-less networking protocols, the DHCP and other session-less protocols do not provide for an indication to be provided at the carrier or provider side when a subscriber host terminates a connection, and overhead associated with the connection is continued to be expended, resulting in unnecessary administration and consumption of resources at the provider side. Examples of such overhead include costs associated with maintaining policy and QoS requirements associated with the subscriber host. It is, therefore, useful to be able to detect subscriber host connectivity (or lack thereof) at the provider side when session-less networking protocols are employed so that the overhead associated with maintaining a policy for a subscriber host from at or near the time the subscriber host disconnects to the expiration of an associated lease can be eliminated. Although an ICMP (Internet Control Message Protocol) ping can be used to verify host connectivity to an IP network, it can not be relied upon to verify connectivity because a subscriber host may be configured not to respond to such pings.

Sending a unicast ARP (Address Resolution Protocol) request to verify subscriber host connectivity in a network in which subscriber host connectivity state information is not maintained is disclosed. An ARP request normally is sent via Ethernet in broadcast mode to discover a physical (e.g., MAC) address that is associated with a particular IP address. A normal ARP request is sent to a broadcast Ethernet address. Hosts associated with the broadcast address receive and process the request. Hosts not associated with the IP address indicated in the request ignore (drop) the request, and the host (if any) with which the IP address indicated in the request is associated responds to the sender with an ARP response indicating a physical (e.g., MAC) address with which the IP address indicated in the ARP request is associated at the responding host. The ARP response is used by the host that sent the ARP request to populate an ARP cache at the sending host, e.g., by adding/updating an entry indicating that the IP address is associated with the MAC address indicated in the ARP response. Since ARP is generally enabled for normal operation, if a subscriber host is still online, it is highly likely to be configured to respond to an ARP request, indicating its continued presence. If the subscriber host does not respond to an ARP request within a prescribed period of time for response, it is assumed in some embodiments that the subscriber host has terminated an associated connection, such that the overhead of maintaining the connection as active until expiration of an associated DHCP lease can be eliminated.

Figure 2:
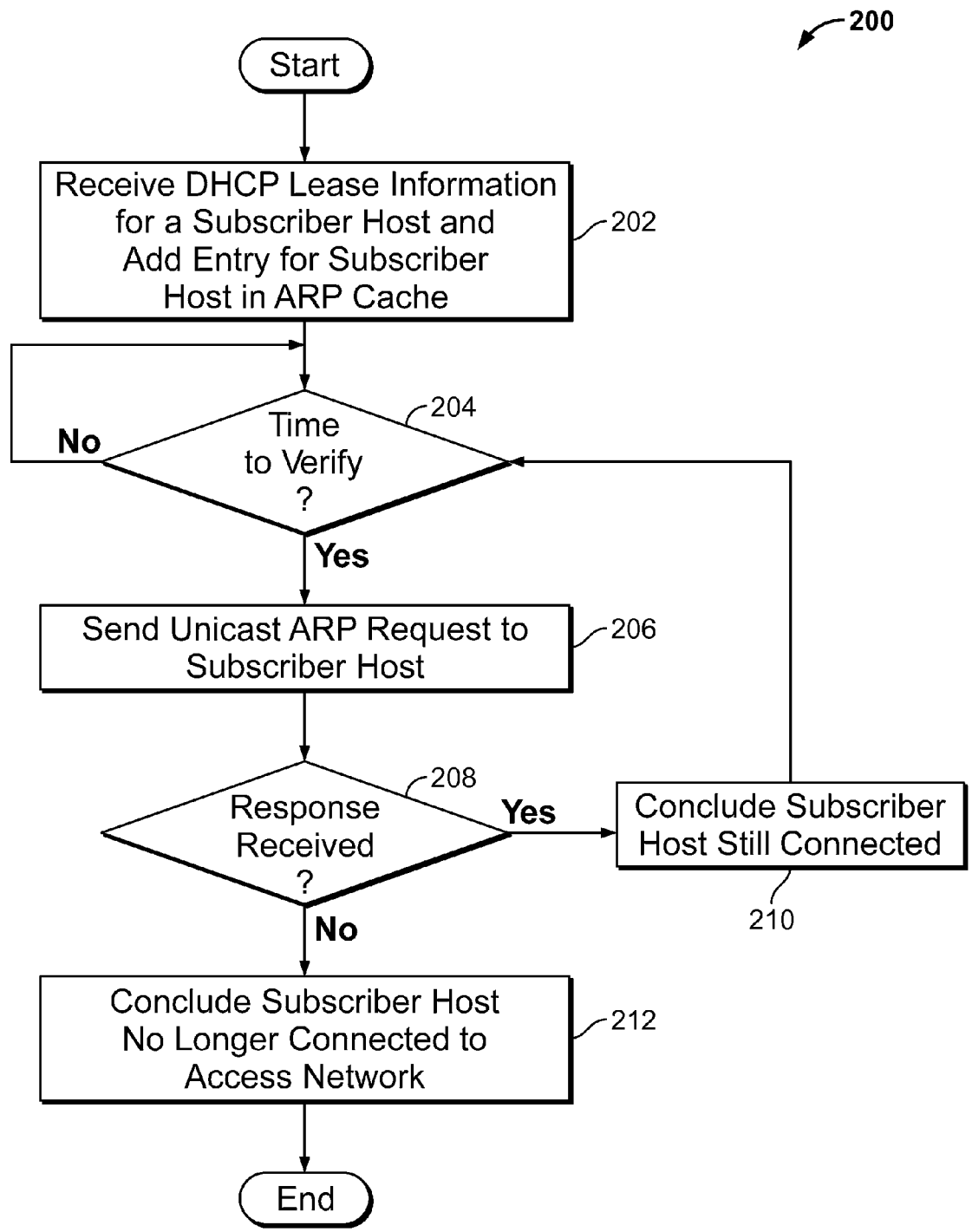
FIG. 2 illustrates an embodiment of a process for periodically determining the connectivity of a subscriber host in a network in which a session-less networking protocol is employed.

FIG. 2 illustrates an embodiment of a process for periodically determining the connectivity of a subscriber host in a network in which a session-less networking protocol is employed. In some embodiments, process 200 is employed by a BRAS, such as BRAS 110 of FIG. 1. Process 200 begins at 202 at which network address lease information, such as DHCP lease information, associated with a subscriber host is received. For example, a DHCP lease may be established for a subscriber host in response to a request from a DHCP client at the subscriber host when the subscriber host first goes online. In some embodiments, a BRAS includes and/or is associated with a DHCP server used to obtain a lease. In some embodiments, a BRAS is configured to monitor DHCP lease communications between a subscriber host and a separate (e.g., third party) DHCP server, and to determine from such monitored communications the association between a lease network (e.g., IP) address and a physical (e.g., MAC) address of a subscriber host with which the lease is associated. In some embodiments, 202 includes adding an entry for the subscriber host in an ARP cache. A data structure such as an ARP cache is employed to cache bindings between leased IP addresses and corresponding subscriber hosts. An ARP cache in some embodiments maps leased IP addresses to corresponding subscriber host MAC addresses. An ARP cache may be populated as leases are established with subscriber hosts, such as at 202 of process 200. In some embodiments, in the cases where a subscriber node corresponds to a residential gateway, IP address to MAC address bindings for online hosts on the subnet associated with the residential gateway may be either learned via dedicated messaging, such as for example, using ARP, and stored in the ARP cache; or the bindings may be supplied by the residential gateway, such as, for example, from its own local Ethernet ARP cache.

Process 200 of FIG. 2 continues at 204 at which it is determined whether it is time to verify the connectivity of the subscriber host of 202. The frequency at which to conduct subscriber host connectivity verifications is established by the associated carrier and/or ISP and may differ among the various subscriber hosts being serviced. If it is determined at 204 that it is not time to verify, process 200 continues to determine whether it is time to verify at 204. If it is determined at 204 that it is time to verify, a unicast ARP request is sent to the subscriber host at 206. The unicast ARP request of 206 is targeted to the subscriber host's MAC address. The subscriber host's MAC address is available from the ARP cache entry added for the subscriber host at 202. In some embodiments, the ARP request is unicast to the subscriber host via a virtual circuit between the subscriber host and BRAS. In some embodiments, the sender hardware address (SHA) field is specified, e.g., with a MAC address associated with the sender (the carrier and/or ISP), but a dummy value such as 0.0.0.0 is used for the sender protocol address (SPA) field of the ARP request because, for example, an IP interface/protocol is not available at the sender. In such cases, responses to the ARP request (e.g., from a subscriber host or residential gateway, if still connected) are targeted to the hardware address of the sender. At 208, it is determined if a response to the unicast ARP request of 206 has been received from the subscriber host. If it is determined at 208 that a response to the unicast ARP request of 206 has been received from the subscriber host, it is concluded at 210 that the subscriber host is still connected, and process 200 returns to 204 to continue to periodically verify the connectivity of the subscriber host. If it is determined at 208 that a response to the unicast ARP request of 206 has not been received from the subscriber host within a prescribed period of time for responding to the request, it is concluded at 212 that the subscriber host is no longer connected to the access network. Process 200 subsequently ends. In various embodiments, 212 includes one or more of the following: terminating the lease with which the lease information received at 202 is associated (e.g., in an embodiment in which a BRAS grants the lease); terminating one or more processes associated with maintaining a connection associated with the subscriber host, such as one or more policy instances associated with the subscriber host; disassociating the subscriber host from one or more processes (e.g., policies) still required to service other subscriber hosts, if applicable; and purging from the ARP cache any entries associated with the subscriber host.

Figure 3:
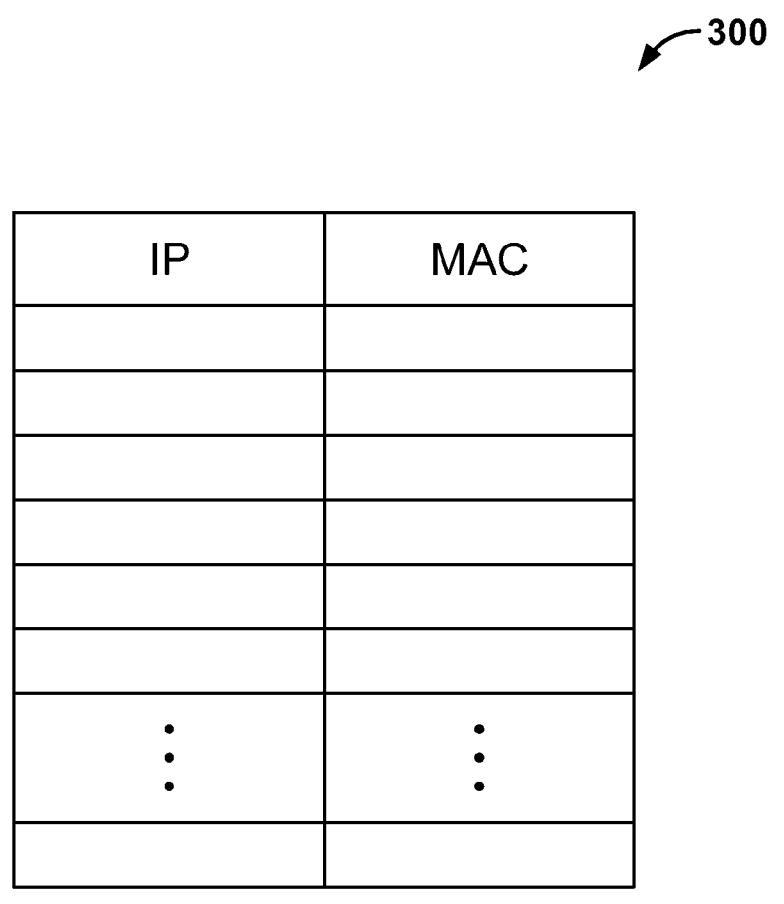

FIG. 3 illustrates an embodiment of a data structure of an ARP cache. As depicted, ARP cache 300 maps leased IP addresses to corresponding subscriber host MAC addresses. Entries may be purged from table 300, for example, at the expiration of a lease if the lease has not been renewed by the associated subscriber host or if it is determined that the associated subscriber host is no longer connected such as at 212 of FIG. 2.

As described herein, maintaining an ARP cache with entries for active leases (e.g., assigned IP addresses) at the carrier or ISP and periodically issuing unicast ARP requests to the physical addresses of the subscriber hosts to verify connectivity enables subscriber host connectivity to be monitored in a network employing a session-less networking protocol.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for verifying subscriber host connectivity, comprising:
   obtaining network address lease information associated with a subscriber host, wherein the subscriber host uses a lease to communicate over a network;
   sending to the subscriber host a unicast address resolution protocol (ARP) request to determine a status of a connection of the subscriber host with the network when a session-less networking protocol that does not retain host connectivity state information is employed for communication;
   determining, based at least in part on whether a response to the ARP request is received from the subscriber host, whether the subscriber host remains connected to the network; and
   in the event that a response to the ARP request is not received from the subscriber host, concluding that the subscriber host is no longer connected to the network and terminating the subscriber host's lease;
   wherein sending to the subscriber host a unicast ARP request to determine a status of a connection of the subscriber host with the network comprises periodically sending the unicast ARP request to the subscriber host to verify the subscriber host's continued connection to the network until the subscriber host's lease is terminated.

2. A method as recited in claim 1, further comprising storing the network address lease information associated with the subscriber host in an ARP cache and wherein an entry for the subscriber host in the ARP cache maps a network address assigned to the subscriber host to a physical address of the subscriber host to which the unicast ARP request is addressed.

3. A method as recited in claim 2, wherein the network address comprises an IP address.

4. A method as recited in claim 2, wherein the physical address comprises a media access control (MAC) address.

5. A method as recited in claim 1, wherein the network comprises a service provider network.

6. A method as recited in claim 1, wherein the session-less networking protocol comprises dynamic host configuration protocol (DHCP).

7. A method as recited in claim 1, wherein determining whether the subscriber host remains connected to the network includes determining whether the subscriber host remains connected to one or more services provided via the network.

8. A method as recited in claim 1, wherein in the event that a response to the ARP request is received from the subscriber host, concluding that the subscriber host remains connected to the network.

9. A method as recited in claim 1, wherein the ARP request is sent by a service provider equipment.

10. A method as recited in claim 1, wherein the ARP request is sent by a provider edge router.

11. A method as recited in claim 1, wherein terminating the subscriber host's lease comprises terminating a process associated with providing to the subscriber host access via the network to a service.

12. A method as recited in claim 1, wherein terminating the subscriber host's lease comprises purging an entry associated with the subscriber host from an ARP cache that stores the network address lease information associated with the subscriber host.

13. A system for verifying subscriber host connectivity, comprising:
    a processor configured to:
        obtain network address lease information associated with a subscriber host, wherein the subscriber host uses a lease to communicate over a network;
        send to the subscriber host a unicast address resolution protocol (ARP) request to determine a status of a connection of the subscriber host with the network when a session-less networking protocol that does not retain host connectivity state information is employed for communication;
        determine, based at least in part on whether a response to the ARP request is received from the subscriber host, whether the subscriber host remains connected to the network; and
        in the event that a response to the ARP request is not received from the subscriber host, conclude that the subscriber host is no longer connected to the network and terminate the subscriber host's lease; and
    a memory coupled to the processor and configured to provide instructions to the processor;
    wherein sending to the subscriber host a unicast ARP request to determine a status of a connection of the subscriber host with the network comprises periodically sending the unicast ARP request to the subscriber host to verify the subscriber host's continued connection to the network until the subscriber host's lease is terminated.

14. A system as recited in claim 13, wherein the session-less networking protocol comprises dynamic host configuration protocol (DHCP).

15. A system as recited in claim 13, wherein in the event that a response to the ARP request is received from the subscriber host, the processor is further configured to conclude that the subscriber host remains connected to the network.

16. A system as recited in claim 13, wherein to terminate the subscriber host's lease comprises to terminate a process associated with providing to the subscriber host access via the network to a service.

17. A system as recited in claim 13, wherein the processor is further configured to store the network address lease information associated with the subscriber host in an ARP cache and wherein an entry for the subscriber host in the ARP cache maps a network address assigned to the subscriber host to a physical address of the subscriber host to which the unicast ARP request is addressed.

18. A system as recited in claim 13, wherein to terminate the subscriber host's lease comprises purging an entry associated with the subscriber host from an ARP cache that stores the network address lease information associated with the subscriber host.

19. A computer program product for verifying subscriber host connectivity, the computer program product being embodied in a non-transitory computer readable medium and comprising computer instructions for:

obtaining network address lease information associated with a subscriber host, wherein the subscriber host uses a lease to communicate over a network;

sending to the subscriber host a unicast address resolution protocol (ARP) request to determine a status of a connection of the subscriber host with the network when a session-less networking protocol that does not retain host connectivity state information is employed for communication;

determining, based at least in part on whether a response to the ARP request is received from the subscriber host, whether the subscriber host remains connected to the network; and in the event that a response to the ARP request is not received from the subscriber host, concluding that the subscriber host is no longer connected to the network and terminating the subscriber host's lease;

wherein sending to the subscriber host a unicast ARP request to determine a status of a connection of the subscriber host with the network comprises periodically sending the unicast ARP request to the subscriber host to verify the subscriber host's continued connection to the network until the subscriber host's lease is terminated.

20. A system as recited in claim 17, wherein the network address comprises an IP address and wherein the physical address comprises a media access control (MAC) address.

21. A computer program product as recited in claim 19, wherein in the event that a response to the ARP request is received from the subscriber host, concluding that the subscriber host remains connected to the network.

22. A computer program product as recited in claim 19, wherein terminating the subscriber host's lease comprises terminating a process associated with providing to the subscriber host access via the network to a service.

* * * * *

UNITED STATES PATENT AND TRADEMARK OFFICE
CERTIFICATE OF CORRECTION

| | | |
|---|---|---|
| PATENT NO. | : 7,827,310 B1 | Page 1 of 1 |
| APPLICATION NO. | : 11/413965 | |
| DATED | : November 2, 2010 | |
| INVENTOR(S) | : Haberman et al. | |

It is certified that error appears in the above-identified patent and that said Letters Patent is hereby corrected as shown below:

Patent Coversheet
Section (22), delete "2008" and insert -- 2006 --

Signed and Sealed this
Eighteenth Day of January, 2011

David J. Kappos
*Director of the United States Patent and Trademark Office*